(12) United States Patent  (10) Patent No.: US 11,703,033 B2
Landa et al.  (45) Date of Patent: Jul. 18, 2023

(54) METHOD AND SYSTEM FOR DETERMINING YAW HEADING OF A WIND TURBINE

(71) Applicant: General Electric Company, Schenectady, NY (US)

(72) Inventors: Bernard P. Landa, Clifton Park, NY (US); Pierino Gianni Bonanni, Loudonville, NY (US); Xu Fu, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 161 days.

(21) Appl. No.: 17/229,199

(22) Filed: Apr. 13, 2021

(65) Prior Publication Data

US 2022/0325699 A1  Oct. 13, 2022

(51) Int. Cl.
 *F03D 17/00* (2016.01)
 *F03D 7/02* (2006.01)
(52) U.S. Cl.
 CPC ........... *F03D 17/00* (2016.05); *F03D 7/0204* (2013.01); *F05B 2260/80* (2013.01); *F05B 2270/329* (2013.01); *F05B 2270/821* (2013.01)
(58) Field of Classification Search
 CPC .... F03D 17/00; F03D 7/0204; F05B 2260/80; F05B 2270/329; F05B 2270/821;
 (Continued)

(56) References Cited

U.S. PATENT DOCUMENTS 4,172,551 A   10/1979 Johnson
4,182,456 A    1/1980 Paul
          (Continued)

FOREIGN PATENT DOCUMENTS

CA    3007275 A1    6/2017
CN  103147917 A     6/2013
          (Continued)

OTHER PUBLICATIONS

C9-4-M8P, u-blox, u-blox RTK Application Board Package https://www.u-blox.com/en/product/c94-m8p.
(Continued)

*Primary Examiner* — Joseph Ortega
(74) *Attorney, Agent, or Firm* — Dority & Manning, P.A.

(57) ABSTRACT

A method and associated system are provided for determining a yaw heading ($\theta_{heading}$) of a wind turbine, the wind turbine having a tower and a nacelle that includes a machine head and rotor at a top thereof. The method includes configuring a single rover receiver of a global navigation satellite system (GNSS) at a fixed position relative to the nacelle. A GNSS geographic location of a tower top pivot point (TPP) of the wind turbine is determined, as well as an angular offset of the rover receiver ($\beta_{rover}$) relative to a centerline axis of the nacelle. Based on the GNSS geo-location of the TPP and a GNSS geo-location of the rover receiver, an angular vector ($\vec{r}$) relative to North of a line between the TPP and the rover receiver is determined. The yaw heading ($\theta_{heading}$) is computed from a difference between the angle ($\vec{r}$) and the angular offset ($\beta_{rover}$) of the rover receiver.

15 Claims, 5 Drawing Sheets

(58) Field of Classification Search
CPC ......... Y02E 10/72; G01S 19/14; G01S 19/43; G01S 19/51; G01S 19/54; G01S 19/50
See application file for complete search history.

(56) References Cited

U.S. PATENT DOCUMENTS

| | | | |
|---|---|---|---|
| 4,263,099 A | 4/1981 | Porter |
| 4,453,085 A | 6/1984 | Pryor |
| 4,602,163 A | 7/1986 | Pryor |
| 4,646,388 A | 3/1987 | Weder et al. |
| 4,689,472 A | 8/1987 | Singleton et al. |
| 4,695,736 A | 9/1987 | Doman et al. |
| 4,704,051 A | 11/1987 | Ellingvag |
| 4,752,012 A | 6/1988 | Juergens |
| 4,776,521 A | 10/1988 | Weder et al. |
| 4,788,440 A | 11/1988 | Pryor |
| 4,816,043 A | 3/1989 | Harrison |
| 4,852,690 A | 8/1989 | Salmi |
| 4,893,757 A | 1/1990 | Weder et al. |
| 5,038,975 A | 8/1991 | Weder et al. |
| 5,233,200 A | 8/1993 | DiMarcello et al. |
| 5,238,707 A | 8/1993 | Weder et al. |
| 5,255,150 A | 10/1993 | Young et al. |
| 5,336,156 A | 8/1994 | Miller et al. |
| 5,340,608 A | 8/1994 | Weder et al. |
| 5,741,426 A | 4/1998 | McCabe et al. |
| 5,867,404 A | 2/1999 | Bryan |
| 5,956,664 A | 9/1999 | Bryan |
| 5,972,062 A | 10/1999 | Zimmermann |
| 5,987,979 A | 11/1999 | Bryan |
| 6,044,698 A | 4/2000 | Bryan |
| 6,245,218 B1 | 6/2001 | Gibson et al. |
| 6,348,146 B1 | 2/2002 | Gibson et al. |
| 6,388,612 B1 | 5/2002 | Neher |
| 6,392,565 B1 | 5/2002 | Brown |
| 6,650,451 B1 | 11/2003 | Byers et al. |
| 6,679,489 B2 | 1/2004 | Casto et al. |
| 6,819,258 B1 | 11/2004 | Brown |
| 6,838,998 B1 | 1/2005 | Brown et al. |
| 6,876,099 B2 | 4/2005 | Wobben |
| 7,124,631 B2 | 10/2006 | Wobben |
| 7,317,260 B2 | 1/2008 | Wilson |
| 7,337,726 B2 | 3/2008 | Wobben |
| 7,551,130 B2 | 6/2009 | Altenschulte |
| 7,581,360 B2 | 9/2009 | Olsen |
| 7,621,843 B2 | 11/2009 | Madge et al. |
| 7,755,210 B2 | 7/2010 | Kammer et al. |
| 7,921,611 B2 | 4/2011 | Olsen |
| 7,942,629 B2 | 5/2011 | Shi et al. |
| 7,966,318 B2 | 6/2011 | Harshfield |
| 7,970,500 B2 | 6/2011 | Parra Carque |
| 8,058,740 B2 | 11/2011 | Altenschulte et al. |
| 8,155,920 B2 | 4/2012 | Egedal |
| 8,174,137 B2 | 5/2012 | Skaare |
| 8,210,811 B2 | 7/2012 | Loh et al. |
| 8,215,896 B2 | 7/2012 | Kooijman et al. |
| 8,225,559 B2 | 7/2012 | Olsen |
| D672,667 S | 12/2012 | Mix |
| 8,337,706 B2 | 12/2012 | McCabe |
| 8,366,389 B2 | 2/2013 | Hoffmann et al. |
| 8,387,675 B1 | 3/2013 | Vaninger et al. |
| 8,441,138 B2 | 5/2013 | Gjerlov et al. |
| 8,489,247 B1 | 7/2013 | Engler |
| 8,516,114 B2 | 8/2013 | Banavar et al. |
| 8,546,967 B2 | 10/2013 | Ormel et al. |
| 8,606,418 B1 | 12/2013 | Myers et al. |
| 8,691,097 B2 | 4/2014 | McCabe |
| 8,720,127 B2 | 5/2014 | Olsen |
| 8,783,326 B1 | 7/2014 | Vaninger et al. |
| 8,881,485 B2 | 11/2014 | Sritharan et al. |
| 8,915,709 B2 | 12/2014 | Westergaard |
| 8,949,420 B2 | 2/2015 | Banavar et al. |
| 9,016,012 B1 | 4/2015 | Sritharan et al. |
| 9,192,879 B2 | 11/2015 | McCabe |
| 9,212,031 B2 | 12/2015 | Schneider et al. |
| 9,290,095 B2 | 3/2016 | Roth |
| 9,454,859 B2 | 9/2016 | Roth |
| 9,546,499 B2 | 1/2017 | Olsen |
| 9,567,978 B2 | 2/2017 | Marwaha et al. |
| 9,579,655 B2 | 2/2017 | DeJohn et al. |
| 9,587,629 B2 | 3/2017 | Desphande et al. |
| 9,605,558 B2 | 3/2017 | Perley et al. |
| 9,624,905 B2 | 4/2017 | Perley et al. |
| 9,631,606 B2 | 4/2017 | Slack et al. |
| 9,637,139 B2 | 5/2017 | Kathan et al. |
| 9,644,606 B2 | 5/2017 | Agarwal et al. |
| 9,644,608 B2 | 5/2017 | Blom et al. |
| 9,702,345 B2 | 7/2017 | Guadayol Roig |
| 9,751,790 B2 | 9/2017 | McCabe et al. |
| 9,759,068 B2 | 9/2017 | Herrig et al. |
| 9,777,711 B2 | 10/2017 | Rossetti |
| 9,810,199 B2 | 11/2017 | Hammerum |
| 9,822,762 B2 | 11/2017 | Kooijman et al. |
| 9,863,402 B2 | 1/2018 | Perley et al. |
| 9,879,654 B2 | 1/2018 | Peiffer et al. |
| 9,909,569 B2 | 3/2018 | Hammerum et al. |
| 9,909,570 B2 | 3/2018 | Klitgaard et al. |
| 9,926,911 B2 | 3/2018 | Butterworth et al. |
| 9,949,701 B2 | 4/2018 | Meyer et al. |
| 10,006,443 B1 | 6/2018 | Vorobieff et al. |
| 10,023,443 B2 | 7/2018 | Herse et al. |
| 10,036,692 B2 | 7/2018 | Perley et al. |
| 10,047,722 B2 | 8/2018 | Vaddi et al. |
| 10,047,726 B2 | 8/2018 | Sakaguchi |
| 10,087,051 B2 | 10/2018 | Assfalg et al. |
| 10,094,135 B2 | 10/2018 | Olsen |
| 10,155,587 B1 | 12/2018 | Tang |
| 10,184,450 B2 | 1/2019 | Wilson et al. |
| 10,184,456 B2 | 1/2019 | Liu et al. |
| 10,215,157 B2 | 2/2019 | Perley et al. |
| 10,257,592 B2 | 4/2019 | Brinker et al. |
| 10,267,293 B2 | 4/2019 | Peiffer et al. |
| 10,294,923 B2 | 5/2019 | Kristoffersen |
| 10,323,192 B2 | 6/2019 | Quanci et al. |
| 10,328,960 B2 | 6/2019 | Fifield |
| 10,385,826 B2 | 8/2019 | Butterworth et al. |
| 10,410,487 B2 | 9/2019 | Joseph |
| 10,457,893 B2 | 10/2019 | Ure et al. |
| 10,495,060 B2 | 12/2019 | Camso et al. |
| 10,605,232 B2 | 3/2020 | Aderhold et al. |
| 10,634,120 B2 | 4/2020 | Landa et al. |
| 2009/0263245 A1 | 10/2009 | Shi et al. |
| 2010/0126115 A1 | 5/2010 | Lim et al. |
| 2010/0133827 A1 | 6/2010 | Huang et al. |
| 2010/0140936 A1 | 6/2010 | Benito et al. |
| 2010/0143128 A1 | 6/2010 | McCorkendale |
| 2010/0140940 A1 | 7/2010 | Kammer et al. |
| 2011/0140420 A1 | 6/2011 | Loh et al. |
| 2013/0287568 A1 | 10/2013 | Miranda |
| 2014/0003936 A1 | 1/2014 | Agarwal et al. |
| 2014/0241878 A1 | 8/2014 | Herrig et al. |
| 2014/0328678 A1 | 11/2014 | Guadayol Roig |
| 2015/0322925 A1 | 11/2015 | Klitgaard et al. |
| 2016/0222946 A1 | 8/2016 | Krings |
| 2016/0356266 A1 | 12/2016 | Koerber et al. |
| 2017/0306926 A1 | 10/2017 | Deshpande et al. |
| 2018/0187446 A1 | 7/2018 | Homsi |
| 2018/0372886 A1 | 12/2018 | Weber et al. |
| 2019/0203698 A1 | 7/2019 | Muller et al. |
| 2020/0025174 A1 | 1/2020 | Landa et al. |
| 2020/0088165 A1 | 3/2020 | Nielsen et al. |
| 2020/0124030 A1 | 4/2020 | Egedal et al. |
| 2022/0154693 A1* | 5/2022 | Marcos ................ F03D 17/00 |

FOREIGN PATENT DOCUMENTS

| | | | |
|---|---|---|---|
| CN | 107630794 A | 1/2018 | |
| CN | 110500238 B | 6/2020 | |
| DE | 102010021643 A1 | 12/2011 | |
| DE | 102016117191 A1 | 3/2018 | |
| EP | 2466255 A1 | 6/2012 | |
| EP | 2599993 A1 * | 6/2013 | ............ F03D 17/00 |
| EP | 2306007 B1 | 11/2013 | |
| EP | 2263126 B1 | 10/2014 | |

(56) References Cited

FOREIGN PATENT DOCUMENTS

| | | |
|---|---:|---|
| EP | 2063110 B1 | 8/2015 |
| EP | 2599993 B1 | 4/2016 |
| EP | 4023882 A1 | 7/2022 |
| WO | WO2017/174090 A1 | 10/2017 |
| WO | WO2017198481 A1 | 11/2017 |
| WO | WO2018050596 A1 | 3/2018 |
| WO | WO2020011323 A1 | 1/2020 |

OTHER PUBLICATIONS

NEO-M8P Series, u-blox, u-blox M8 High Precision GNSS Modules.
http://www.u-blox.com/en/product/neo-m8p-series
Web Page Only https://www.researchgate.net/profile/Mohd_Hafiz_Yahya/publication/261841729/figure/fig1/AS:392498989027332@1470590459207/RTK-GPS-Overview_W640.jpg.
Wikipedia, Real-Time Kinematic (Web Page Only) https://en.wikipedia.org/wiki/Real-time_kinematic.
Wohlert, Measuring Rotor Blades with Lasers, Reducing Wear on Wind Turbines, WindTech International, vol. 12, No. 4, Jun. 2016, 4 Pages.
The European Search Report for EP application No. 22166050.9, dated Aug. 29, 2022.

* cited by examiner

METHOD AND SYSTEM FOR DETERMINING YAW HEADING OF A WIND TURBINE

FIELD

The present subject matter relates generally to wind turbines and, more particularly, to a method and system to accurately determine the yaw heading of the wind turbine hub.

BACKGROUND

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy from wind using known airfoil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

Yaw heading is a critical operating parameter for wind turbines and is required for referencing to the prevailing wind direction, resolving loading conditions in a longitudinal or lateral direction, and for wind-up tracking of electrical cables.

Global navigation satellite system (GNSS) sensing methods are known and practiced for providing yaw heading using two GNSS rover sensors with position tracking antennas. By independent tracking capability of each sensor, a heading vector between each sensor is able to be determined and correlated to a yaw heading.

Other traditional methods for yaw tracking include the use of encoders on the yaw drive motors and magnetometer sensors.

The traditional yaw determination methods either lack accuracy and precision (encoders and magnetometer sensors) or require the use of additional sensors (two GNSS rover sensors) that increase system costs and complexity.

In addition, as hub sizes and heights continue to increase along with size and capacity of wind turbines, the steel tower that supports the hub becomes an increasingly critical component. Conditions such as settling of the tower base, relaxation of flange components, shifting of tower segments or structural loads, operational loading, environmental loading, and other variables, can all affect the integrity and life of the tower. It is important to monitor and track the reactionary loads on the tower over time in order to manage/control operating parameters and maintenance practices to ensure the integrity and longevity of the tower. In addition, the monitoring and tracking of tower deflections is a useful tool for operational control of mechanical loads and power capture.

The top of the tower during a no-load or idle state behaves as a neutral pivot point, which is a deflection-free position of the tower top about which the nacelle (including the machine head and rotor) rotate. Over time, the loads and other conditions affecting the tower mentioned above may cause this pivot point to deflect in a fore-aft, side-to-side, or torsional manner. Long-time variations in the pivot point (which may be permanent deflections) are an indication of tower structure and/or foundation changes over time. Short-time variations in the pivot point are an indication of oscillatory motion of the tower from rotor and/or drive train loads.

It would be desirable to accurately establish a known geographic reference position for the tower top pivot point and to track changes in this position over time. This information would be useful for monitoring the integrity of the steel structure and tower foundation and for control and management of structural and operational loads that may generate sway and decrease the life of the tower and other wind turbine components. Modeling methods can be applied utilizing the deflections of the tower top pivot point to determine the fore/aft and side-to-side deflections of the tower top and the associated reactionary loads.

The present invention addresses certain drawbacks of the conventional systems and provides a highly accurate method and system for determining yaw heading that is less complex than the traditional two-sensor GNSS systems via determination of the virtual center of the tower top (the tower top pivot point) and utilization of a single GNSS sensor. by utilizing.

BRIEF DESCRIPTION

Aspects and advantages of the invention will be set forth in part in the following description, or may be obvious from the description, or may be learned through practice of the invention.

In accordance with aspects of the invention, a method is provided for determining a yaw heading ($\theta_{heading}$) of a wind turbine, the wind turbine having a tower and a nacelle that includes a machine head and rotor at a top of the tower. The method includes configuring a single rover receiver of a global navigation satellite system (GNSS) at a fixed position relative to the nacelle so as to move/rotate ("yaw") with the nacelle. A GNSS geographic location ("geo-location") of a tower top pivot point (TPP) of the wind turbine is determined, as well as an angular offset of the rover receiver ($\beta_{rover}$) relative to a centerline axis of the nacelle. Based on the GNSS geo-location of the TPP and a GNSS geo-location of the rover receiver, an angular vector ($\vec{r}$) relative to North of a line between the TPP and the rover receiver is determined. The method computes the yaw heading ($\theta_{heading}$) from a difference between the angular vector ($\vec{r}$) and the angular offset ($\beta_{rover}$) of the rover receiver.

The term "geo-location" is used herein to include coordinates on a fixed geographic grid, such as latitude and longitude coordinates of a global grid.

In a particular embodiment, the GNSS geo-location of the TPP is determined by conducting one or more partial or full 360-degree yaw sweeps of the nacelle and recording geo-location signals received by the rover receiver during the yaw sweeps. Via a controller, the geo-location signals are converted into a circular plot and a radius (r) of the circular plot is determined, the radius (r) being a distance between the rover receiver and the TPP. Based on the GNSS geo-location of the rover receiver and the radius (r), the controller determines the GNSS geo-location of the TPP.

The rover receiver may be located at any desired position on the nacelle or on a member attached to the nacelle. For example, the rover may be located atop and at a back end of the nacelle on an arm that extends at a predetermined fixed distance (x) to the centerline axis of the nacelle. The GNSS geo-location of the TPP along the centerline axis is computed based on the radius (r), the distance (x), and a determined distance (y) of the TPP along the centerline axis. The angular offset ($\beta_{rover}$) of the rover receiver can then be determined based on the relationship of $\beta_{rover}$=sin−1 (x/r) and the yaw heading ($\theta_{heading}$) is determined based on the relationship of: $\theta_{heading}$=(angular vector $\vec{r}$))−($\beta_{rover}$).

In an embodiment, the rover receiver is in communication with a fixed base station receiver that transmits correction data to the rover receiver, wherein the GNSS geo-location of the rover is determined relative to the base station based on an absolute global latitude and longitude position of the fixed base station supplied directly to the rover.

The yaw sweeps may include a plurality of 360-degree yaw sweeps with at least one yaw sweep in a positive direction and at least one yaw sweep in an opposite negative direction. These yaw sweeps may be conducted during low wind speeds so as to minimize transient wind loads that may cause deflection of the tower during the yaw sweeps.

Various environmental and structural loading factors can induce a temporary or permanent distortion to the tower, and it may be desirable for the method to account for these distortions in determining the radius of the yaw sweeps (and thus the geo-location of the TPP). For example, a tower distortion correction factor may be applied to correct for tower distortion caused by weight overhang of the rotor and the nacelle relative to a vertical axis of the tower. Another tower distortion correction factor may be applied to correct for thermal tower distortion caused by temperature differences between exposed and shaded sides of the tower. Yet another tower distortion correction factor may be applied to correct for tower distortion from transient loads placed on the tower or nacelle, such as wind loads. A total tower distortion correction factor may be applied that accounts for weight overhang distortion, thermal distortion, and load distortion.

The method may also include determining the geo-location of the TPP a plurality of times over a fixed time period and determining a total trajectory or displacement vector of the TPP over the time period. The total trajectory or displacement vector may be used for one or more of: determination of tower integrity, tower life prediction, load management, tower maintenance, or changes in operating and maintenance procedures to reduce tower distortion.

The present invention also encompasses a system for determining a yaw heading ($\theta_{heading}$) of a wind turbine, the wind turbine having a tower and a nacelle that includes a machine head and rotor at a top thereof. The system includes a single rover receiver of a global navigation satellite system (GNSS) at a fixed position relative to the nacelle so as to move/rotate ("yaw") with the nacelle, for example on the nacelle or on a member attached to the nacelle. A controller is in communication with the rover receiver and is configured to perform the following operations: determine a GNSS geographic location ("geo-location") of a tower top pivot point (TPP); determine an angular offset of the rover receiver ($\beta_{rover}$) relative to a centerline axis of the nacelle; based on the GNSS geo-location of the TPP and a GNSS geo-location of the rover receiver, determine an angular vector ($\vec{r}$) relative to North between the TPP and the rover receiver; and compute the yaw heading ($\theta_{heading}$) from a difference between the angular vector ($\vec{r}$) and the angular offset ($\beta_{rover}$) of the rover receiver.

In various embodiments of the system, the controller is configured to perform any one or combination of the functionalities discussed above with respect to the method embodiments of the invention.

In a particular embodiment, the rover receiver is located atop and at a back end of the nacelle at a predetermined fixed distance (x) to the centerline axis of the nacelle, wherein the GNSS geo-location of the TPP along the centerline axis is determined by the controller based on the radius (r), the distance (x), and a determined distance (y) of the TPP along the centerline axis.

In one embodiment of the system, the rover receiver is in communication with a fixed base station receiver that transmits correction data to the rover receiver, wherein the controller is configured to determine the GNSS geo-location of the rover relative to the base station based on an absolute global latitude and longitude position of the fixed base station supplied directly to the rover.

The invention will be further supported and described with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a method and associated system for determining yaw heading of a wind turbine hub with use of a single GNSS sensor in conjunction with tracking a geographic location of the pivot point of a top of a wind turbine tower, wherein the pivot point is essentially a neutral deflection-free position of the tower top about which the nacelle (including the machine head and rotor) rotate. As described herein, the location and deflection of the tower top pivot point (TPP) also provides valuable information for purposes of analyzing and correcting for permanent and transient distortions of the tower.

Figure 1:
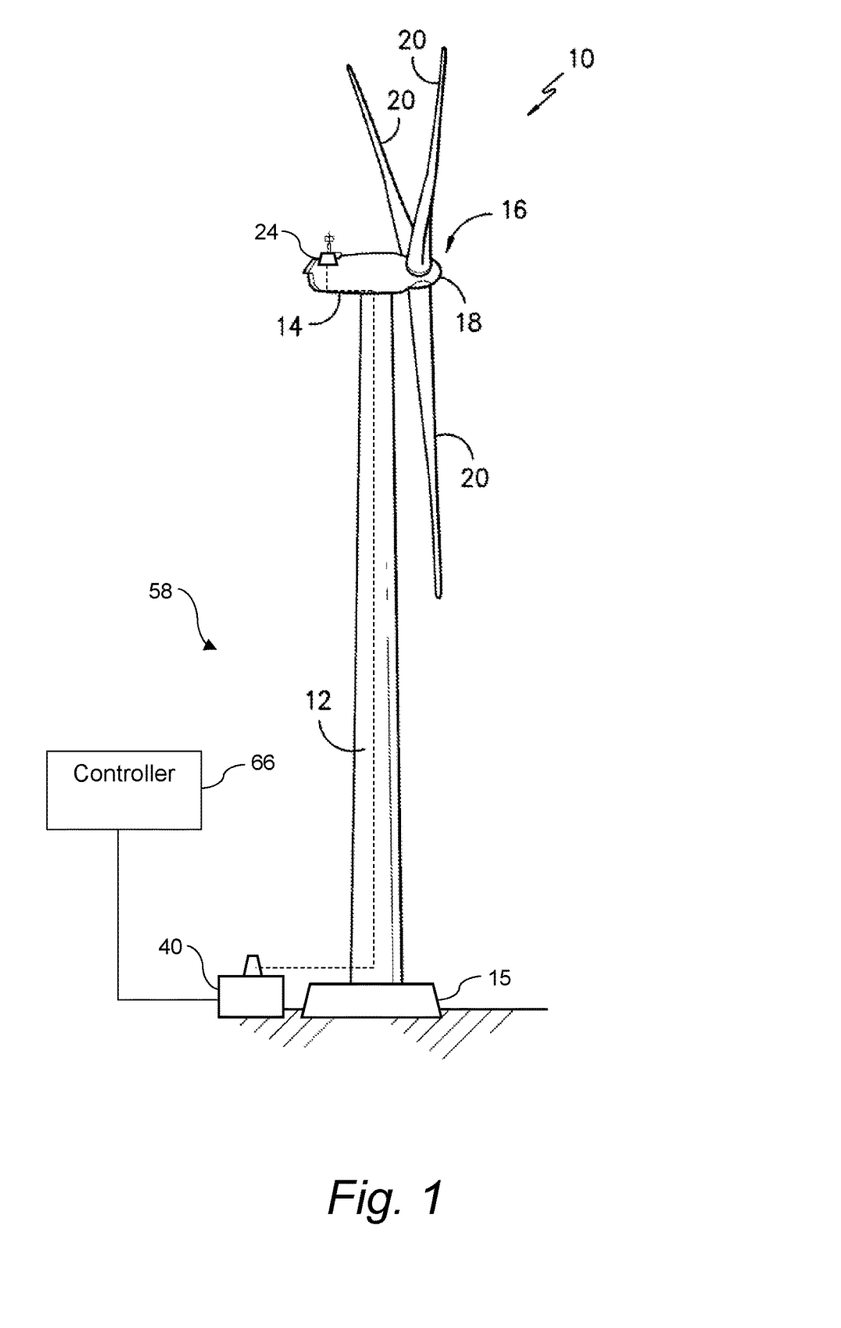
FIG. 1 illustrates a perspective view of one embodiment of a wind turbine configured with a system and method in accordance with the present invention.

Referring now to the drawings. FIG. 1 illustrates a perspective view of one embodiment of a wind turbine 10 configured with a system 58 for practicing various methods according to the present disclosure. As shown, the wind turbine 10 generally includes a tower 12 atop a support 15, a nacelle 14 mounted on the tower 12, and a rotor 16 coupled to the nacelle 14. The rotor 16 includes a rotatable hub 18 and at least one rotor blade 20 coupled to and extending outwardly from the hub 18. For example, in the illustrated embodiment, the rotor 16 includes three rotor blades 20. However, in an alternative embodiment, the rotor 16 may include more or less than three rotor blades 20. Each rotor blade 20 may be spaced about the hub 18 to facilitate rotating the rotor 16 to enable kinetic energy to be transferred from the wind into usable mechanical energy, and subsequently, electrical energy. For instance, the hub 18 may be rotationally coupled to an electric generator positioned within the nacelle 14 to permit electrical energy to be produced.

For purposes of the present disclosure, the term "nacelle" is used herein to include machine head components (e.g., drive train components, generator, etc.) located within the nacelle housing and the hub 18 components.

Figure 2:
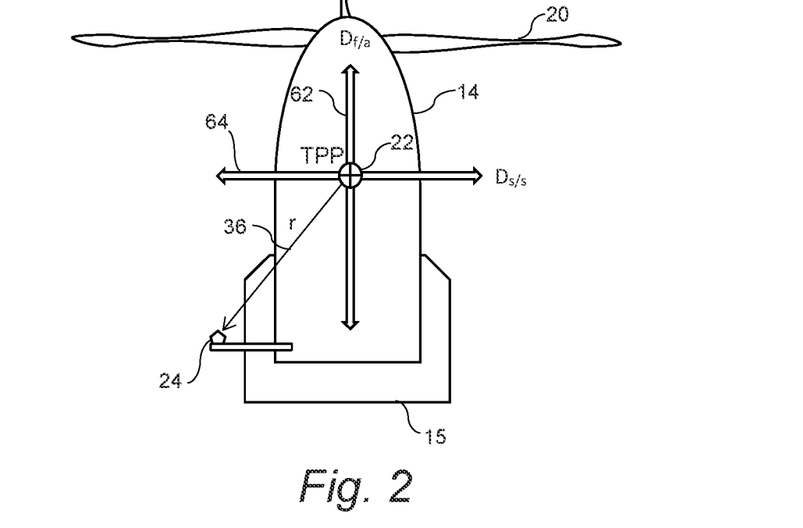
FIG. 2 is a diagram view of a nacelle configured with a single sensor to carry out method embodiments of the invention.

Referring to FIGS. 1 and 2, a single rover receiver 24 of a global navigation satellite system (GNSS) is mounted at a fixed, predetermined position on the nacelle 14. The rover receiver 24 is in direct or indirect communication with a controller 66. In the depicted embodiment, the rover receiver 24 is also in communication with a fixed base station 40, as described in greater detail below. The controller 66 may be a local controller associated with a single wind turbine 10, a farm-level controller associated with a plurality of wind turbines 10 within a wind farm, or a remote controller located, for example, in a remote control/monitoring facility. The controller 66 is configured to carry out various processes, as described in greater detail below, for determining the geo-location of the TPP 22 of the wind turbine tower 12 and the yaw heading of the hub 18.

The GNSS system may utilize any of the available satellite-based positioning systems, such as GPS, GLONASS, Galileo, NavIC, and BeiDou. In certain embodiments, the GNSS system may also employ real-time kinematic (RTK) techniques to enhance the precision of the position data derived from the GNSS system. RTK techniques are known to those-skilled in the art. In general, the distance between a satellite navigation receiver (the rover receiver 24) and a satellite can be calculated from the time it takes for a signal to travel from the satellite to the receiver. The accuracy of the resulting range measurement is a function of the receiver's ability to accurately process signals from the satellite, as well as additional error sources such as non-mitigated ionospheric and tropospheric delays, multipath, satellite clock, and ephemeris errors, etc.

RTK techniques use the satellite signal's carrier wave as its signal. RTK uses a fixed base station 40 and the rover 24 to transmit correction data to the rover receiver 24 and reduce the rover's position error. The base station 40 rebroadcasts the phase of the carrier that it observes, and the rover 24 compares its own phase measurements with the one received from the base station. This allows the rover receiver 24 to calculate its relative position with respect to the base station 40 with a high degree of accuracy (typically within millimeters). The accuracy of the geo-location of the rover receiver 24 is thus essentially the same accuracy as the computed position of the base station 40. In essence, the base station 40 is located at a known surveyed location (a benchmark position) and the rover receiver 24 takes a fix relative to the base station 40.

As mentioned, alternatively, the geo-location of the rover may be based on the absolute global latitude and longitude position supplied directly to the rover from the GNSS satellite(s).

Figure 4:
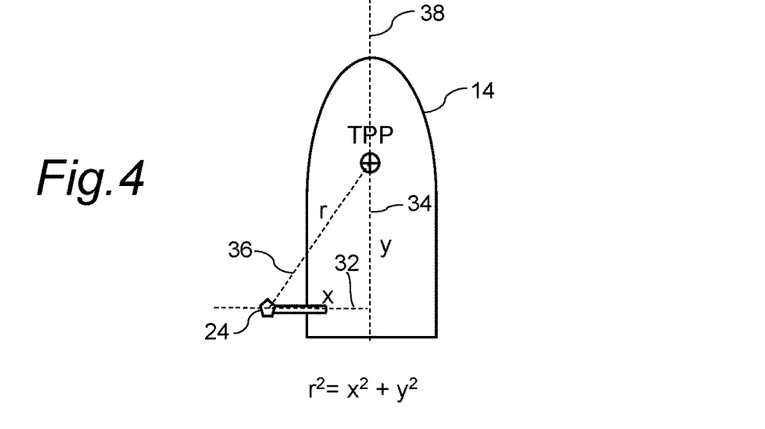
FIG. 4 is a diagram view depicting further method steps according to an embodiment of the invention.

Referring to FIGS. 2 and 4, the rover receiver 24 can be located at any desired location on the nacelle, on a member attached to the nacelle, or on any other structure that is fixed relative to the nacelle so as to move/rotate ("yaw") with the nacelle, for example atop and at a back end of the nacelle 14 on a member (e.g., and arm). The rover receiver extends at a predetermined fixed distance 32 ("x") to a centerline axis 38 of the nacelle. The rover receiver 24 may be mounted so as to extend outboard from the sides of the nacelle 14, as depicted in the figures. For purposes of determining the geo-location of the TPP 22 based on the GNSS geo-location of the rover receiver 24, it is reasonably assumed that the TPP 22 lies on (or within an acceptable margin from) the centerline 38 of the nacelle 14.

Figure 3:
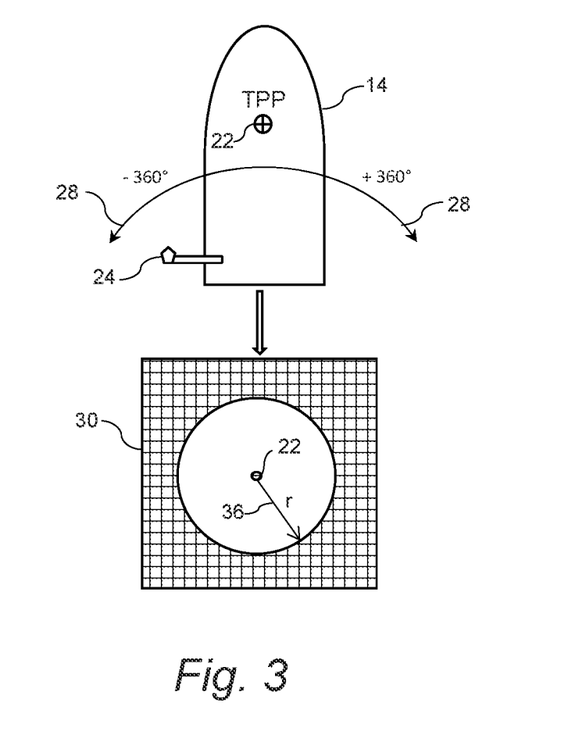
FIG. 3 is a diagram view depicting method steps according to an embodiment of the invention.

Referring to FIGS. 2 through 4, the various method embodiments include conducting a one or more partial or full 360-degree yaw sweeps 28 of the nacelle 14 and recording the geo-location signals received by the rover receiver 24 during the yaw sweeps 28. As depicted in FIG. 3, the yaw sweeps may include a plurality of 360-degree yaw sweeps 28 with one or more yaw sweeps 28 in a positive direction and one or more yaw sweeps 28 in an opposite negative direction. Alternatively, all of the yaw sweeps may be conducted in the same direction. The yaw sweeps should be done under low wind speed conditions.

The controller 66 converts the geo-location signals of the rover receiver 24 into a circular plot 30 and determines a radius "r" 36 of the circular plot (FIG. 3). This radius 36 corresponds to the distance from the rover receiver 24 to the TPP 22 of the wind turbine tower 12. The controller 66 then uses the length of the radius 36 and the geo-location of the rover receiver 24 to compute a geo-location of the TPP 22. For example, referring to FIG. 4, knowing the distance "x" 32 of the rover receiver 24 from the centerline axis 38 of the nacelle 14 and with the assumption that the TPP lies on the centerline axis 38 at a distance "y" 34 from the line of "x" 32, the length of "y" 34 is readily solved using the relationship for a right-triangle: $r^2=x^2+y^2$. With the values of "x" and "y" determined, the precise geo-location of TPP 22 relative to the geo-location of the rover receiver 24 is then easily determined. The latitude and longitude changes (x and y) to a known geo-location of the rover receiver 24 will give the geo-location of the TPP.

Figure 6:
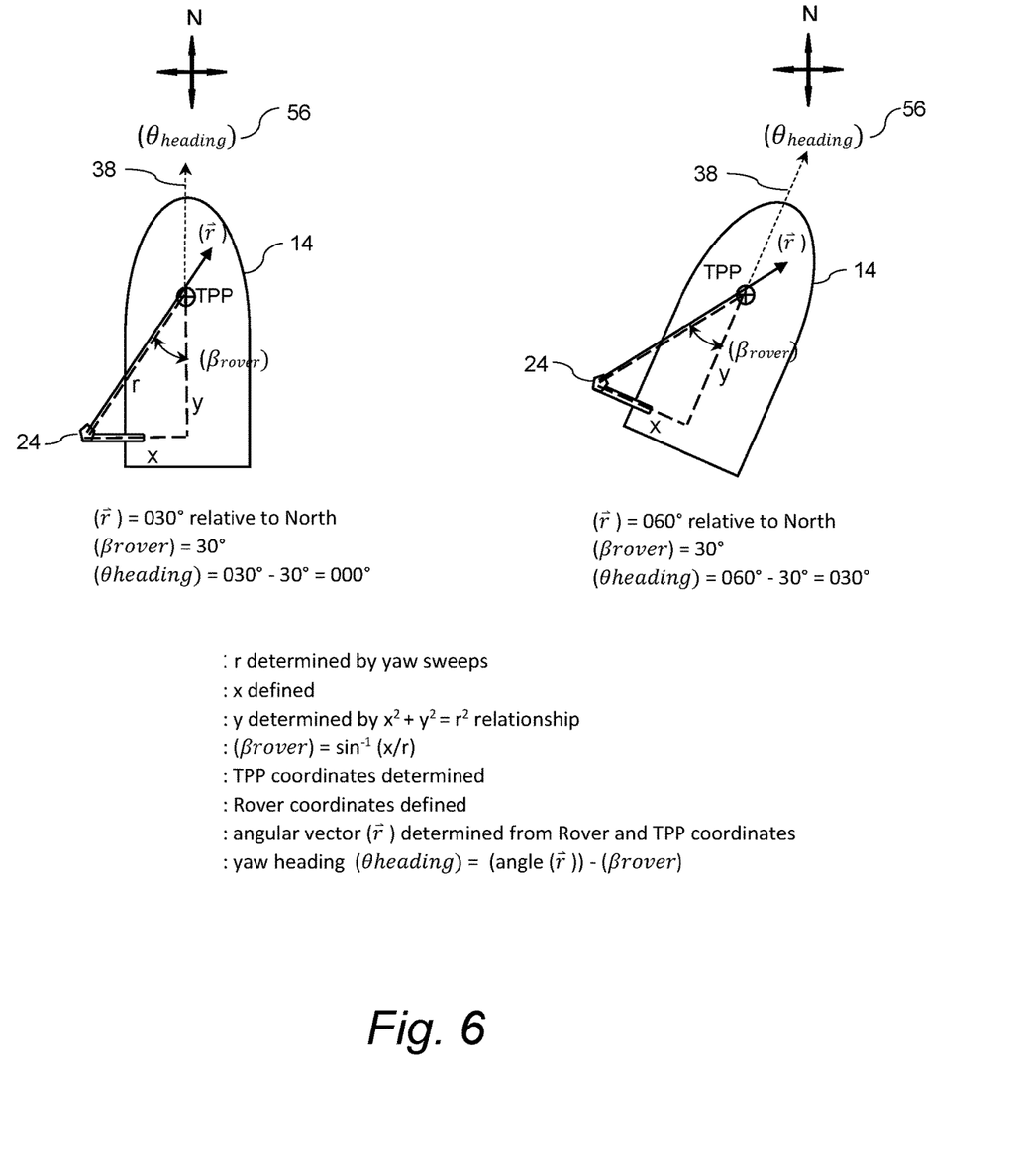
FIG. 6 is a diagram view depicting more method steps according to an embodiment of the invention.

FIG. 6 depicts determination of the yaw heading ($\theta_{heading}$) of the hub 18 in accordance with aspects of the invention. Along with determination of the TPP as discussed above, the angular offset ($\beta_{rover}$) of the rover receiver is determined based on the relationship of: $\beta_{rover}=\sin-1$ (x/r). Based on the GNSS geo-location of the TPP and a GNSS geo-location of the rover receiver 24, an angular vector ($\vec{r}$) relative to North of a line between the TPP and the rover receiver is determined. The method computes the yaw heading ($\theta_{heading}$) from a difference between the angular vector ($\vec{r}$) and the angular offset ($\beta_{rover}$) of the rover receiver: $\theta_{heading}$=(angular vector ($\vec{r}$))−($\beta_{rover}$).

Examples of the yaw heading ($\theta_{heading}$) determination are depicted in FIG. 6. In the left-had depiction, the angular vector ($\vec{r}$) relative to North is determined to be 030° and the angular offset (βrover) is determined to be 30°. The yaw heading ($\theta_{heading}$) computed from $\theta_{heading}$=(angular vector ($\vec{r}$))−($\beta_{rover}$) is thus: ($\theta_{heading}$)=030°−30°=000° (North).

In the right-hand depiction, the angular vector ($\vec{r}$) relative to North is determined to be 060° and the angular offset ($\beta_{rover}$) is determined to be 30°. The yaw heading ($\theta_{heading}$) computed from $\theta_{heading}$=(angular vector ($\vec{r}$))−($\beta_{rover}$) is thus: ($\theta_{heading}$)=060°−30°=030°.

Figure 7:
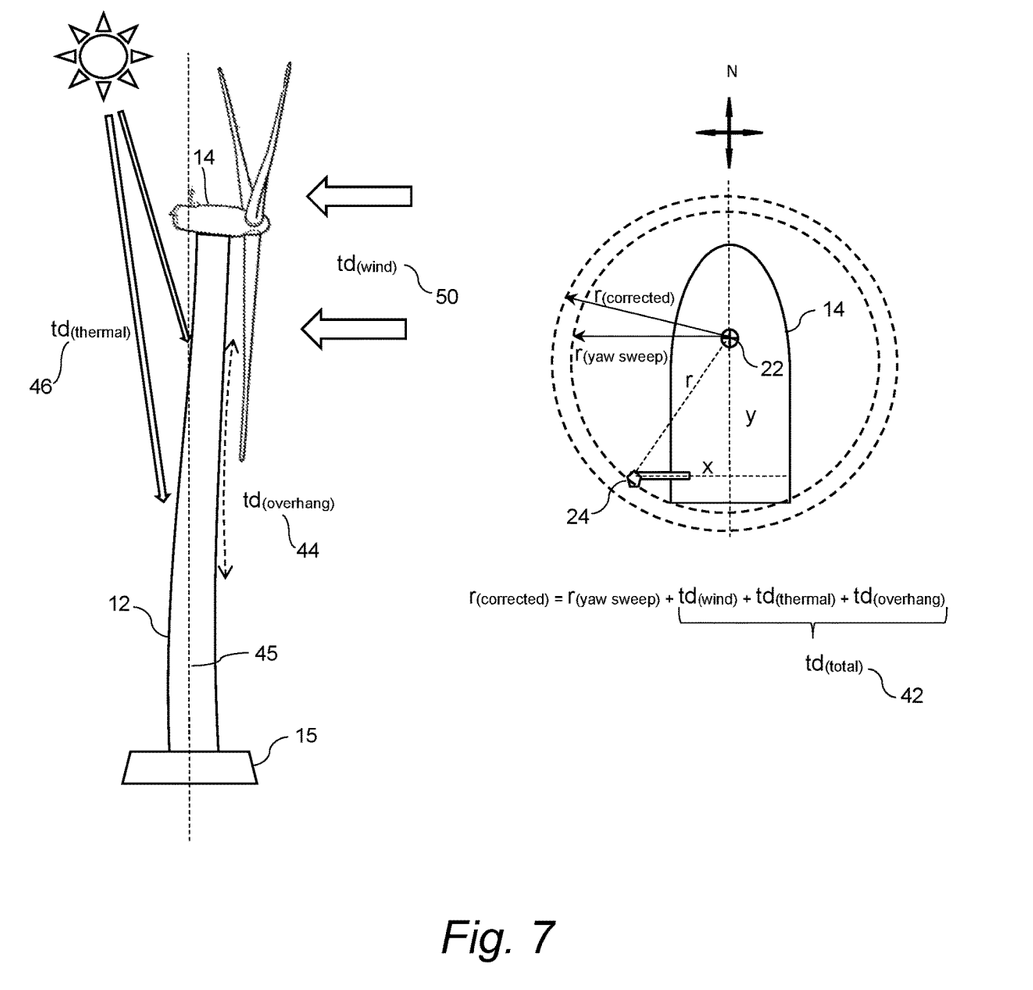
FIG. 7 is a diagram view depicting still other method steps according to an embodiment of the invention.

Referring to FIG. 7, certain factors acting on the tower 12 can produce permanent or transient distortions in the tower 12 that could affect the accuracy of the initial determination of the radius 36 of the yaw sweeps 28. For example, the center of mass of the nacelle 14 (including the machine head components and the hub 18) is typically not aligned with the centerline 45 of the nacelle 14, but overhangs towards the hub 18, thus creating a moment arm on the tower 12. As the yaw sweeps 28 are conducted, the tower may continuously "lean" towards the hub 18 (indicated by the dashed arrow in FIG. 6). If this "lean" is not accounted for, the radius 36 of the yaw sweep 28 would be decreased by the amount of the "lean". The degree of the "lean" can be determined empirically or through modeling of the nacelle 14 and tower 12. An overhang tower distortion correction factor 44 (td(overhang)) can be computed and applied to the radius 36 of the yaw sweep 28 to give a corrected radius 36.

Still referring to FIG. 7, temperature differences between sides of the tower 12 can result in a thermal distortion of the tower 12. The temperature differential resulting from solar heating of one side of the tower compared to the shaded side of the tower can cause expansion of the heated side and leaning of the tower towards the shaded side. The degree of thermal distortion can be determined empirically or through modeling and used to compute a thermal tower distortion correction factor 46 (td$_{(thermal)}$) that is applied to the radius 36 of the yaw sweep 28 to give a corrected radius 36.

Still referring to FIG. 7, transient loads on the nacelle 14 caused by wind can also result in distortion of the tower 12, causing the tower to lean away from the direction of the wind. The degree of wind load distortion can be determined empirically or through modeling and used to compute a wind tower distortion correction factor 50 (td$_{(wind)}$) that is applied to the radius 36 of the yaw sweep 28 to give a corrected radius 36.

All of the distortion correction factors 44, 46, and 50 can be combined into a total distortion factor 42 that is applied to the radius 36 of the yaw sweep 28 to give a corrected radius 36.

Figure 5:
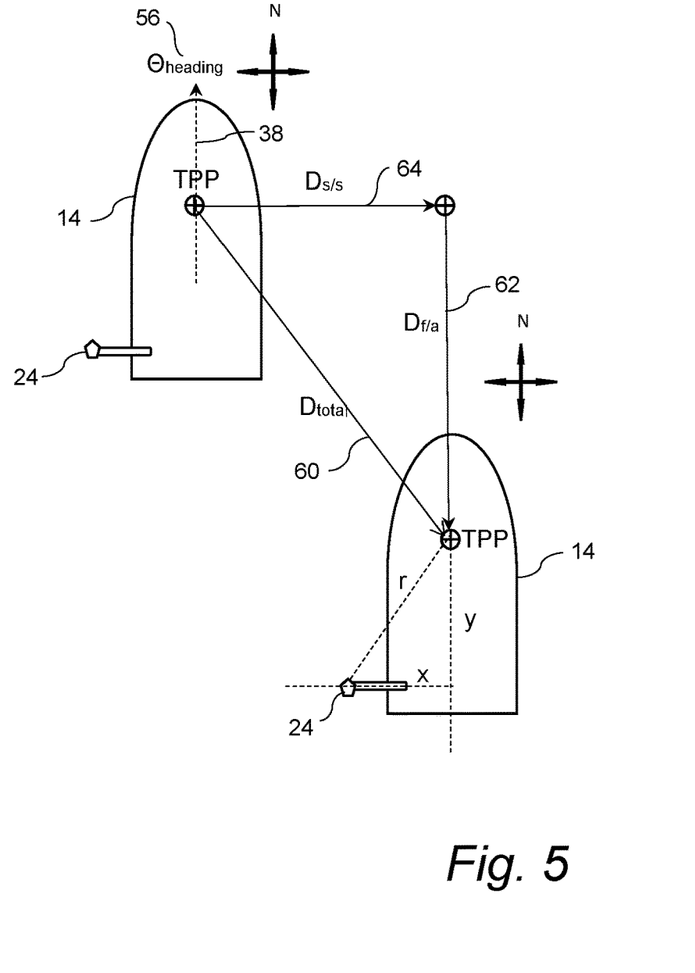
FIG. 5 is a diagram view depicting still other method steps according to an embodiment of the invention.

Referring to FIG. 5, embodiments of the present method may also include determining the geo-location of the TPP as described above a plurality of times over a fixed time period and determining a total displacement trajectory of the TPP over the time period, which may be represented by a vector. The multiple TPP's form the total displacement trajectory which can be combined into a total displacement vector 60 for the monitored time period, the total displacement vector 60 having a side-to-side component 64 and a fore-aft component 62. As mentioned above, the displacement of the TPP over time may be indicative of various factors affecting tower distortion as well as a reference for tower deflection measurements. TPP changes resulting from tower distortion may be the result of foundation settling, seismic movement, tower shell/flange relaxation, incipient structural failure, and others. Displacements of the tower from the load imparted to the tower from rotor, machine head, and environmental effects can be accurately measured and reported based on movement of the TPP. The total displacement vector 60 or displacement trajectory of TPP can be used for evaluating/determining various tower characteristics, including determination of tower integrity, tower life prediction (longevity), load management, tower maintenance, or changes in operating and maintenance procedures to reduce tower distortion. Based on any one or more of these characteristics, the method includes implementing control actions or procedures to counter any adverse effects on the tower or overall operation of the wind turbine.

Further aspects of the invention are provided by the subject matter of the following clauses:

Clause 1: A method for determining a yaw heading ($\theta_{heading}$) of a wind turbine, the wind turbine having a tower and a nacelle that includes a machine head and rotor at a top thereof, the method comprising configuring a single rover receiver of a global navigation satellite system (GNSS) at a fixed position relative to the nacelle; determining a GNSS geographic location ("geo-location") of a tower top pivot point (TPP) of the wind turbine; determining an angular offset of the rover receiver ($\beta_{rover}$) relative to a centerline axis of the nacelle; based on the GNSS geo-location of the TPP and a GNSS geo-location of the rover receiver, determining an angular vector ($\vec{r}$) relative to North of a line between the TPP and the rover receiver; and computing the yaw heading ($\theta_{heading}$) from a difference between the angular vector ($\vec{r}$) and the angular offset ($\beta_{rover}$) of the rover receiver.

Clause 2: The method according to the preceding clause, wherein the GNSS geo-location of the TPP is determined by: conducting one or more partial or full 360-degree yaw sweeps of the nacelle and recording geo-location signals received by the rover receiver during the yaw sweeps; via a controller, converting the geo-location signals into a circular plot and determining a radius (r) of the circular plot, the radius (r) being a distance between the rover receiver and the TPP; and based on the GNSS geo-location of the rover receiver and the radius (r), determining, via the controller, the GNSS geo-location of the TPP.

Clause 3: The method according to any preceding clause, wherein the rover receiver is located atop and at a back end of the nacelle at a predetermined fixed distance (x) to the centerline axis of the nacelle, wherein the GNSS geo-location of the TPP along the centerline axis is computed based on the radius (r), the distance (x), and a determined distance (y) of the TPP along the centerline axis.

Clause 4: The method according to any preceding clause, wherein the angular offset ($\beta_{rover}$) of the rover receiver is determined based on the relationship of $\beta_{rover}=\sin^{-1}(x/r)$ and the yaw heading ($\theta_{heading}$) is determined based on the relationship of: $\theta_{heading}$=(angular vector ($\vec{r}$))−($\beta_{rover}$).

Clause 5: The method according to any preceding clause, wherein the rover receiver is in communication with a fixed base station receiver that transmits correction data to the rover receiver, wherein the GNSS geo-location of the rover is determined relative to the base station based on an absolute global latitude and longitude position of the fixed base station supplied directly to the rover.

Clause 6: The method according to any preceding clause, wherein the yaw sweeps comprise a plurality of 360-degree yaw sweeps with at least one yaw sweep in a positive direction and at least one yaw sweep in an opposite negative direction.

Clause 7: The method according to any preceding clause, wherein the plurality of 360-degree yaw sweeps of the nacelle are conducted during low wind speeds so as to minimize transient wind loads that may cause deflection of the tower during the yaw sweeps.

Clause 8: The method according to any preceding clause, wherein a tower distortion correction factor is applied to the radius from the yaw sweeps prior to determining the geo-location of the TPP.

Clause 9: The method according to any preceding clause, wherein the tower distortion correction factor corrects for tower distortion caused by any one or combination of: weight overhang of the nacelle relative to a vertical axis of the tower; thermal tower distortion caused by temperatures differences between sides of the tower; or tower distortion from transient loads placed on the tower or nacelle.

Clause 10: The method according to any preceding clause, further comprising determining the geo-location of the TPP a plurality of times over a fixed time period and determining a total trajectory or displacement vector of the TPP over the time period.

Clause 11: The method according to any preceding clause, further comprising evaluating the total trajectory or displacement vector for purposes of one or more of: determination of tower integrity, tower life prediction, load management, tower maintenance, or changes in operating and maintenance procedures to reduce tower distortion.

Clause 12: A system for determining a yaw heading ($\theta_{heading}$) of a wind turbine, the wind turbine having a tower and a nacelle that includes a machine head and rotor at a top thereof, the system comprising: a single rover receiver of a global navigation satellite system (GNSS) at a fixed position relative to the nacelle; a controller in communication with the rover receiver, the controller configured to perform the following operations: determine a GNSS geographic location ("geo-location") of a tower top pivot point (TPP); determine an angular offset of the rover receiver ($\beta_{rover}$) relative to a centerline axis of the nacelle; based on the GNSS geo-location of the TPP and a GNSS geo-location of the rover receiver, determine an angular vector ($\vec{r}$) relative to North between the TPP and the rover receiver; and compute the yaw heading ($\theta_{heading}$) from a difference between the angular vector ($\vec{r}$) and the angular offset ($\beta_{rover}$) of the rover receiver.

Clause 13: The system according to any preceding clause, wherein the GNSS geo-location of the TPP is determined by conducting one or more partial or full 360-degree yaw sweeps of the nacelle and recording geo-location signals received by the rover receiver during the yaw sweeps, the controller configured to convert the geo-location signals into a circular plot and determining a radius (r) of the circular plot, the radius (r) being a distance between the rover receiver and the TPP; and based on the GNSS geo-location of the rover receiver and the radius (r), determine the GNSS geo-location of the TPP.

Clause 14: The system according to any preceding clause, wherein the rover receiver is located atop and at a back end of the nacelle at a predetermined fixed distance (x) to the centerline axis of the nacelle, wherein the GNSS geo-location of the TPP along the centerline axis is determined by the controller based on the radius (r), the distance (x), and a determined distance (y) of the TPP along the centerline axis.

Clause 15: The system according to any preceding clause, wherein the controller is configured to determine the angular offset ($\beta_{rover}$) of the rover receiver based on the relationship of $\beta_{rover}=\sin^{-1}(x/r)$ and to determine the yaw heading ($\theta_{heading}$) based on the relationship of: $\theta_{heading}=$(angular vector ($\vec{r}$))$-(\beta_{rover})$.

Clause 16: The system according to any preceding clause, wherein the rover receiver is in communication with a fixed base station receiver that transmits correction data to the rover receiver, wherein the controller is configured to determine the GNSS geo-location of the rover relative to the base station based on an absolute global latitude and longitude position of the fixed base station supplied directly to the rover.

Clause 17: The system according to any preceding clause, wherein the controller is further configured to apply a tower distortion correction factor to the radius prior to determining the geo-location of the TPP based on one or more of: weight overhang of the nacelle relative to a vertical axis of the tower; thermal tower distortion caused by temperatures differences between sides of the tower; and tower distortion from transient loads placed on the tower or nacelle.

Clause 18: The system according to any preceding clause, wherein the controller is further configured to evaluate a total trajectory or displacement vector of the TPP over time and implement one or more corrective actions for the wind turbine based on the evaluation.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for determining a yaw heading (θheading) of a wind turbine, the wind turbine having a tower and a nacelle that includes a machine head and rotor at a top thereof, the method comprising:
    configuring a single rover receiver of a global navigation satellite system (GNSS) at a fixed position relative to the nacelle spaced from a centerline axis of the nacelle;
    determining a GNSS geographic location ("geo-location") of a tower top pivot point (TPP) of the wind turbine;
    determining an angular offset of the rover receiver (βrover) relative to the centerline axis of the nacelle based on a relationship of βrover=sin−1 (x/r), wherein (r) is a distance between the rover receiver and the TPP and (x) is a predetermined fixed distance of the rover receiver to the centerline axis of the nacelle;
    based on the GNSS geo-location of the TPP and a GNSS geo-location of the rover receiver, determining an angular vector ($\vec{r}$) relative to North of a line between the TPP and the rover receiver; and
    computing the yaw heading (θheading) from a difference between the angular vector ($\vec{r}$) and the angular offset (βrover) of the rover receiver based on the relationship:

θheading=(angular vector($\vec{r}$))−(βrover).

2. The method according to claim 1, wherein the GNSS geo-location of the TPP is determined by:
    conducting one or more partial or full 360-degree yaw sweeps of the nacelle and recording geo-location signals received by the rover receiver during the yaw sweeps;
    via a controller, converting the geo-location signals into a circular plot and determining a radius (r) of the circular plot, the radius (r) corresponding to the distance (r) between the rover receiver and the TPP; and
    based on the GNSS geo-location of the rover receiver and the radius (r), determining, via the controller, the GNSS geo-location of the TPP.

3. The method according to claim 2, wherein the rover receiver is located atop and at a back end of the nacelle at the predetermined fixed distance (x) to the centerline axis of the nacelle, wherein the GNSS geo-location of the TPP along the centerline axis is computed based on the radius (r), the distance (x), and a determined distance (y) of the TPP along the centerline axis.

4. The method according to claim 2, wherein the rover receiver is in communication with a fixed base station receiver that transmits correction data to the rover receiver, wherein the GNSS geo-location of the rover is determined relative to the base station based on a latitude and longitude position of the fixed base station supplied directly to the rover.

5. The method according to claim 2, wherein the yaw sweeps comprise a plurality of 360-degree yaw sweeps with at least one yaw sweep in a first direction and at least one yaw sweep in an opposite second direction.

6. The method according to claim 2, wherein the plurality of 360-degree yaw sweeps of the nacelle are conducted during low wind speeds so as to minimize transient wind loads that may cause deflection of the tower during the yaw sweeps.

7. The method according to claim 1, wherein a tower distortion correction factor is applied to the radius from the yaw sweeps prior to determining the geo-location of the TPP to correct for tower distortion caused by any one or combination of; weight overhang of the nacelle relative to a vertical axis of the tower; thermal tower distortion caused by temperatures differences between sides of the tower: or tower distortion from transient loads placed on the tower or nacelle.

8. The method according to claim 1, further comprising determining the geo-location of the TPP a plurality of times over a fixed time period and determining a total trajectory or displacement vector of the TPP over the time period.

9. The method according to claim 8, further comprising evaluating the total trajectory or displacement vector for purposes of one or more of: determination of tower integrity, tower life prediction, load management, tower maintenance, or changes in operating and maintenance procedures to reduce tower distortion.

10. A system for determining a yaw heading (θheading) of a wind turbine, the wind turbine having a tower and a nacelle that includes a machine head and rotor at a top thereof, the system comprising:
a single rover receiver of a global navigation satellite system (GNSS) at a fixed position relative to the nacelle spaced from a centerline axis of the nacelle;
a controller in communication with the rover receiver, the controller configured to perform the following operations:
determine a GNSS geographic location ("geo-location") of a tower top pivot point (TPP);
determine an angular offset of the rover receiver (βrover) relative to the centerline axis of the nacelle based on a relationship of βrover=sin−1 (x/r), wherein (r) is a distance between the rover receiver and the TPP and (x) is a predetermined fixed distance of the rover receiver to the centerline axis of the nacelle;
based on the GNSS geo-location of the TPP and a GNSS geo-location of the rover receiver, determine an angular vector ($\vec{r}$) relative to North between the TPP and the rover receiver; and
compute the yaw heading (θheading) from a difference between the angular vector ($\vec{r}$) and the angular offset (βrover) of the rover receiver based on the relationship:

θheading=(angular vector($\vec{r}$))−(βrover).

11. The system according to claim 10, wherein the GNSS geo-location of the TPP is determined by conducting one or more partial or full 360-degree yaw sweeps of the nacelle and recording geo-location signals received by the rover receiver during the yaw sweeps, the controller configured to convert the geo-location signals into a circular plot and determining a radius (r) of the circular plot, the radius (r) corresponding to the distance between the rover receiver and the TPP; and based on the GNSS geo-location of the rover receiver and the radius (r), determine the GNSS geo-location of the TPP.

12. The system according to claim 11, wherein the rover receiver is located atop and at a back end of the nacelle at the predetermined fixed distance (x) to the centerline axis of the nacelle, wherein the GNSS geo-location of the TPP along the centerline axis is determined by the controller based on the radius (r), the distance (x), and a determined distance (y) of the TPP along the centerline axis.

13. The system according to claim 12, wherein the rover receiver is in communication with a fixed base station receiver that transmits correction data to the rover receiver, wherein the controller is configured to determine the GNSS geo-location of the rover relative to the base station based on a latitude and longitude position of the fixed base station supplied directly to the rover.

14. The system according to claim 11, wherein the controller is further configured to apply a tower distortion correction factor to the radius prior to determining the geo-location of the TPP to correct for tower distortion caused by one or more of: weight overhang of the nacelle relative to a vertical axis of the tower; thermal tower distortion caused by temperatures differences between sides of the tower; and tower distortion from transient loads placed on the tower or nacelle.

15. The system according to claim 11, wherein the controller is further configured to evaluate a total trajectory or displacement vector of the TPP over time.

* * * * *